United States Patent [19]

Bianco et al.

[11] Patent Number: 5,115,121

[45] Date of Patent: May 19, 1992

[54] VARIABLE-SWEEP BAR CODE READER

[75] Inventors: James S. Bianco, Enfield, Conn.; Bernard Drummond, Southwick, Mass.

[73] Assignee: Control Module Inc., Enfield, Conn.

[21] Appl. No.: 461,936

[22] Filed: Jan. 5, 1990

[51] Int. Cl.⁵ ............................................. G06K 7/10
[52] U.S. Cl. .................................. 235/467; 235/466; 235/470
[58] Field of Search ............... 235/462, 463, 466, 467, 235/472, 470, 454; 350/6.6, 6.5

[56] References Cited

U.S. PATENT DOCUMENTS

| | | | |
|---|---|---|---|
| 4,289,957 | 9/1981 | Neyroud et al. | 235/454 |
| 4,409,469 | 10/1983 | Yasuda et al. | 235/463 |
| 4,411,016 | 10/1983 | Wakeland | 382/62 |
| 4,418,279 | 11/1983 | Yatsunami | 235/462 |
| 4,516,023 | 5/1985 | Morrill et al. | 350/6.6 |
| 4,800,256 | 1/1989 | Broockman et al. | 235/467 |
| 4,930,848 | 6/1990 | Knowles | 350/6.6 |
| 4,967,076 | 10/1990 | Schumacher et al. | 235/467 |
| 5,010,242 | 4/1991 | Frontino | 235/467 |

Primary Examiner—Stuart S. Levy
Assistant Examiner—Christopher R. Glembocki
Attorney, Agent, or Firm—John H. Crozier

[57] ABSTRACT

There is provided, in one preferred embodiment, a bar code reader which has a variable scan angle, with the amplitude of the scan angle initially being relatively small and then increasing in magnitude until a bar code is read. As the amplitude of the scan angle increases, the scan frequency is decreased, thereby keeping the scan rate across the bar code relatively constant. Consequently, for example, a high-density bar code may be read at either a close distance or a far distance without sacrificing resolution. Additionally, the reading of a selected bar code in the presence of other, closely-spaced bar codes is facilitated. In another preferred embodiment, the scan frequency is held constant and the clock rate in the bar code reader is increased with increasing amplitude of the scanning angle. In yet another preferred embodiment, scan angle and frequency are held constant, while a microprocessor varies the length of the bar code decoded and increases/decreases resolution to compensate for the distance of the bar code from the reader head.

5 Claims, 5 Drawing Sheets

VARIABLE-SWEEP BAR CODE READER

BACKGROUND OF THE INVENTION

1. Field of the Invention

The Present invention relates to bar code readers generally and, more particularly, to a novel bar code reader which permits reading bar codes of varying size over a wide range of distances, while allowing good bar discrimination regardless of such size or distance.

2. Background Art

Bar codes have found application in a wide variety of applications as an information source, typically for digital processors. Such bar codes are used at point-of-sale in merchandising for pricing and inventory count, in controlled personnel access systems, and in manufacturing for work-in-process and inventory control, to name only a few applications. The bar codes themselves comprise a series of parallel lines, typically in the range of about ¼" to 1" in height and from about 1 to 50 mils in thickness, arrayed on a contrasting background. The lines may variously have unequal spacings and/or unequal thicknesses, with the variations in spacing and/or thickness determined by the information "stored" in the bar code. A bar code is "read" by serially illuminating the bars, with the bars absorbing light and the background reflecting light. The resulting pattern of reflection and nonreflection is sensed by a light detecting device which provides input to the digital processor. The bar code reader may be of the type that is passed over the bar code or of the type with which the bar code is moved passed the bar code reader.

There are two widely used types of bar codes: (1) the high-density type, the narrowest element of which is 7 mils wide and which includes 10 characters per inch for Code 39, and (2) the low-density type, the narrowest element of which is 30 mils wide and which includes 3 characters per inch for Code 39. The former is typically read at close range, while the latter is typically read at a distance.

Known bar code readers serially scan bar codes at a fixed rate of sweep. As a bar code is scanned, there is generated a number of pulse counts per bar, derived from a fixed clock signal, the number of counts being directly proportional to the width of a particular bar and, conversely, the number of counts between bars being directly proportional to the width of a particular space. Since the rate of sweep through the scan angle is fixed, the scan rate across a bar code that is positioned close to the bar code reader will be less than the scan rate across a bar code that is positioned farther from the bar code reader. It can be understood, therefore, that 3 counts for a given bar may be generated when, say, a high-density bar code is being read at a distance close to the bar code reader; but, if the same bar is at a farther distance from the bar code reader, only 1, or even less, count per bar may be generated because of the greater scan rate at that distance. As a result, that bar code reader would be unsuitable for reading that bar code at that farther distance. Likewise, when trying to read a low-density bar code having wide elements at close range, the high counts obtained may overload the decoding circuitry in the bar code reader. Consequently, it is necessary, in many cases, to provide a plurality of bar code readers having different fixed parameters in order to be able to read bar codes at different distances and/or the operator must adjust the position of the bar code reader relative to the bar codes.

A further disadvantage of present bar code readers is that they employ a fixed scan angle. Consequently, when one attempts to use such a bar code reader to read a bar code which has other bar codes in proximity to it, the bar code reader may scan portions of two or more bar codes. In some cases, this may be of no consequence, since the bar code reader will decode a scanned bar code only when it detects the quiet zones on either end of the encoded information. In other cases, however, portions of two or more bar codes may be scanned before the reader recognizes the quiet zones and, therefore, a false reading is obtained. One common method of trying to avoid this problem is to hold the bar code reader such as to place the plane of the scan at an angle to the axis of the bar code so that at least bar codes in line with the one being read will not be scanned. Another method of trying to avoid this problem is to provide the bar code reader with a fixed light source in addition to the scanning light source. When the operator wishes to read a bar code, he switches to the fixed light source to assure where the bar code reader is pointing, then switches to the other light source for scanning. Either of these methods somewhat improves the accuracy of bar code scanning, but both add additional time to the process.

Accordingly, it is a principal object of the present invention to provide a bar code reader which can read a range of bar code sizes over a range of distances.

Another object of the invention is to provide such a bar code reader which employs relatively conventional components and is economical to construct and easy to use.

An additional object of the invention is to provide such a bar code reader which improves the accuracy of bar code reading when there are other bar codes in proximity to the one being read.

Other objects of the present invention, as well as particular features and advantages thereof, will be apparent from the following description and the accompanying drawing figures.

SUMMARY OF THE INVENTION

The present invention achieves the above objects, among others, and substantially overcomes the limitations of known conventional devices by providing, in one preferred embodiment, a bar code reader which has a variable scan angle, with the amplitude of the scan angle initially being relatively small and then increasing in magnitude until a bar code is read. As the amplitude of the scan angle increases, the scan frequency is decreased, thereby keeping the scan rate across the bar code relatively constant. Consequently, for example, a high-density bar code may be read at either a close distance or a far distance without sacrificing resolution. Additionally, the reading of a selected bar code in the presence of other, closely-spaced bar codes is facilitated. In another preferred embodiment, the scan frequency is held constant and the clock rate in the bar code reader is increased with increasing amplitude of the scanning angle. In yet another preferred embodiment, scan angle and frequency are held constant, while a microprocessor varies the length of the bar code decoded and increases/decreases resolution to compensate for the distance of the bar code from the reader head.

DESCRIPTION OF THE PREFERRED EMBODIMENTS

Figure 1:
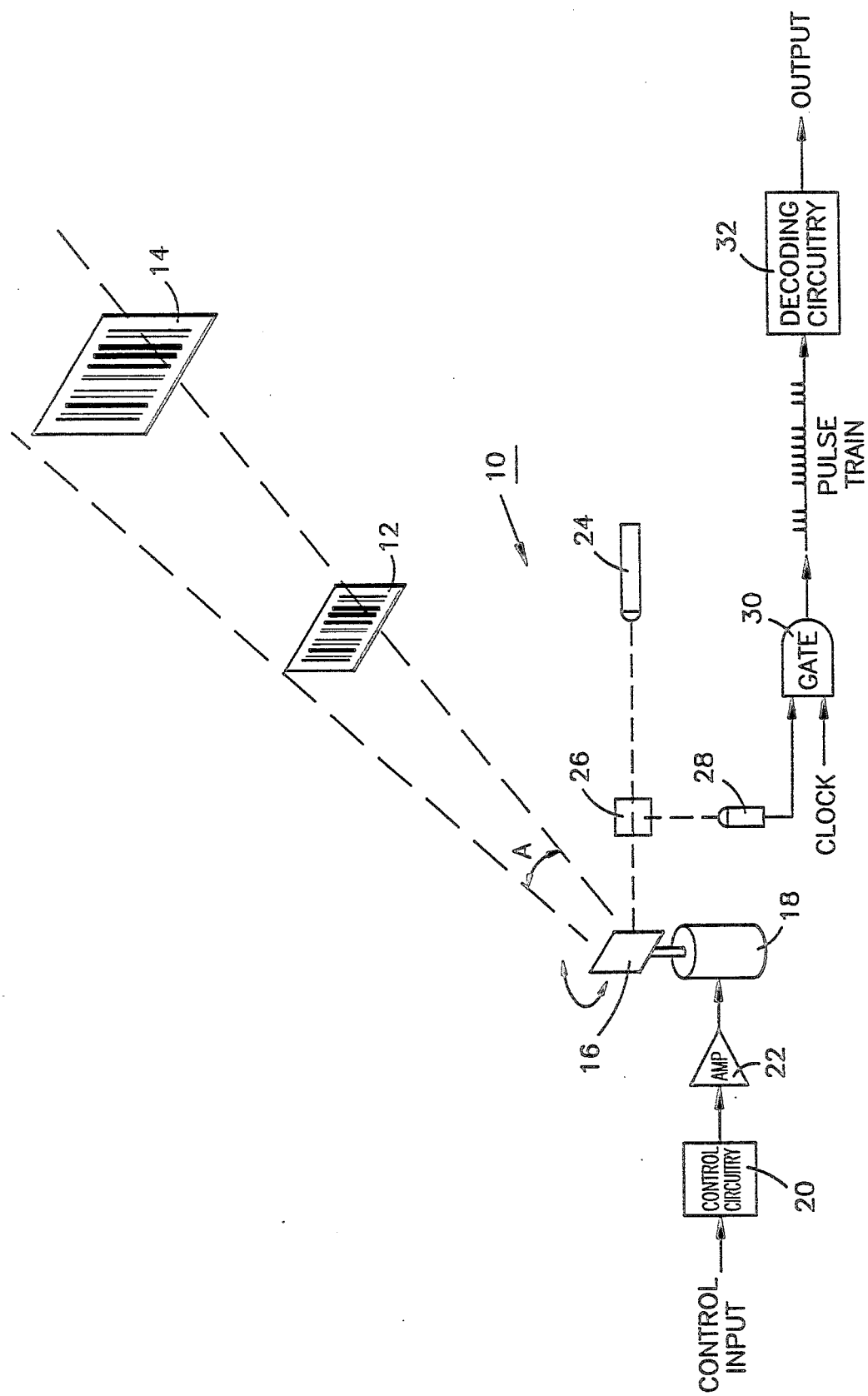
FIG. 1 is a partially perspective and partially schematic view of a conventional bar code reading system.

Referring now to the Drawing, in which the same or similar elements are given consistent identifying numerals throughout the various figures, FIG. 1 shows a bar code reader, generally indicated by the reference numeral 10, positioned to read high-density bar code 12 and low-density bar code 14. Included in bar code reader 10 is a mirror 16 which is oscillated, as indicated by the double-headed arrow, by a oscillator 18. Oscillator 18 is driven by control circuitry 20 through a power amplifier 22, which control circuitry causes mirror 16 to rotate back and forth through a constant angle A at a constant frequency. A light source 24, which may be a light source producing either visible or invisible light, provides a beam of light through a beam splitter 26 to mirror 16, the oscillation of which mirror casts a moving team of light toward bar codes 12 and 14, the beam defining a sinusoidal waveform of constant scan angle A and constant frequency, as shown on FIG. 2.

Referring to FIG. 1, light reflected from bar codes 12 and 14 returns on the same path as the light to the bar codes, is reflected from mirror 16 to beam splitter 26, and is reflected by the beam splitter to a photodetector 28. The output of photodetector 28 is an input to an AND gate 30, the other input to which gate is a fixed clock signal. The output of AND gate 30 is a pulse train in which the numbers of pulses, or counts, in each group of counts indicate the width of the bars of a bar code. The pulse train is an input to decoding circuitry 32 which provides an output from bar code reader 10.

The relationship between the number of counts and the scan rate, with scan rate being defined as the rate of movement of the light beam across a bar code in terms of distance per unit time, is given by: I. $(counts) = (clock\ rate) \times (bar\ width)/(scan\ rate)$; and II. $(scan\ rate) = K (scan\ frequency) \times (distance\ between\ bar\ code\ and\ bar\ code\ reader)$, where K is a constant.

Figure 2:
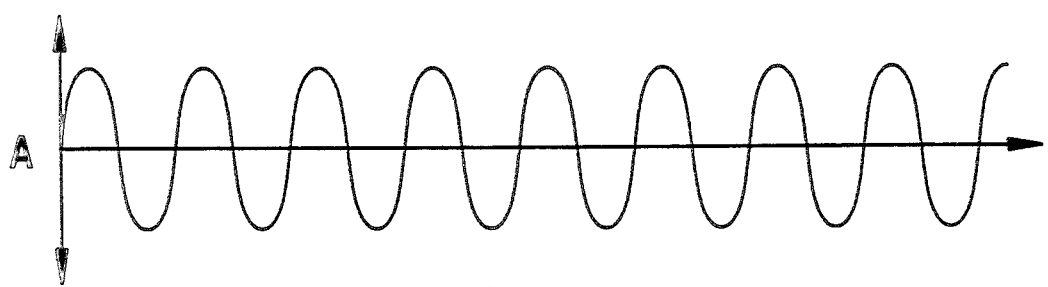
FIG. 2 indicates the scan angle amplitude and scan frequency of the system of FIG. 1.

Inspection of FIG. 1 will show that the scan rate across bar code 14 will be greater than that across bar code 12 by virtue of the former's greater distance from mirror 16, since the frequency of scanning is constant (FIG. 2). For the arrangement shown, this difference is compensated for somewhat by the fact that bar code 14 has wider bars than has bar code 12 and, therefore, the counts per bar on bar code 14 may be relatively the same as the counts per bar on bar code 12. However, it can be appreciated that, if bar code 12 were at the distance from mirror 16 where bar code 14 is located, the scan rate across bar code 12 could be too great to accurately read the code. Conversely, if bar code 14 were at the location of bar code 12, the number of counts per bar could overload decoding circuitry 32.

Figure 3:
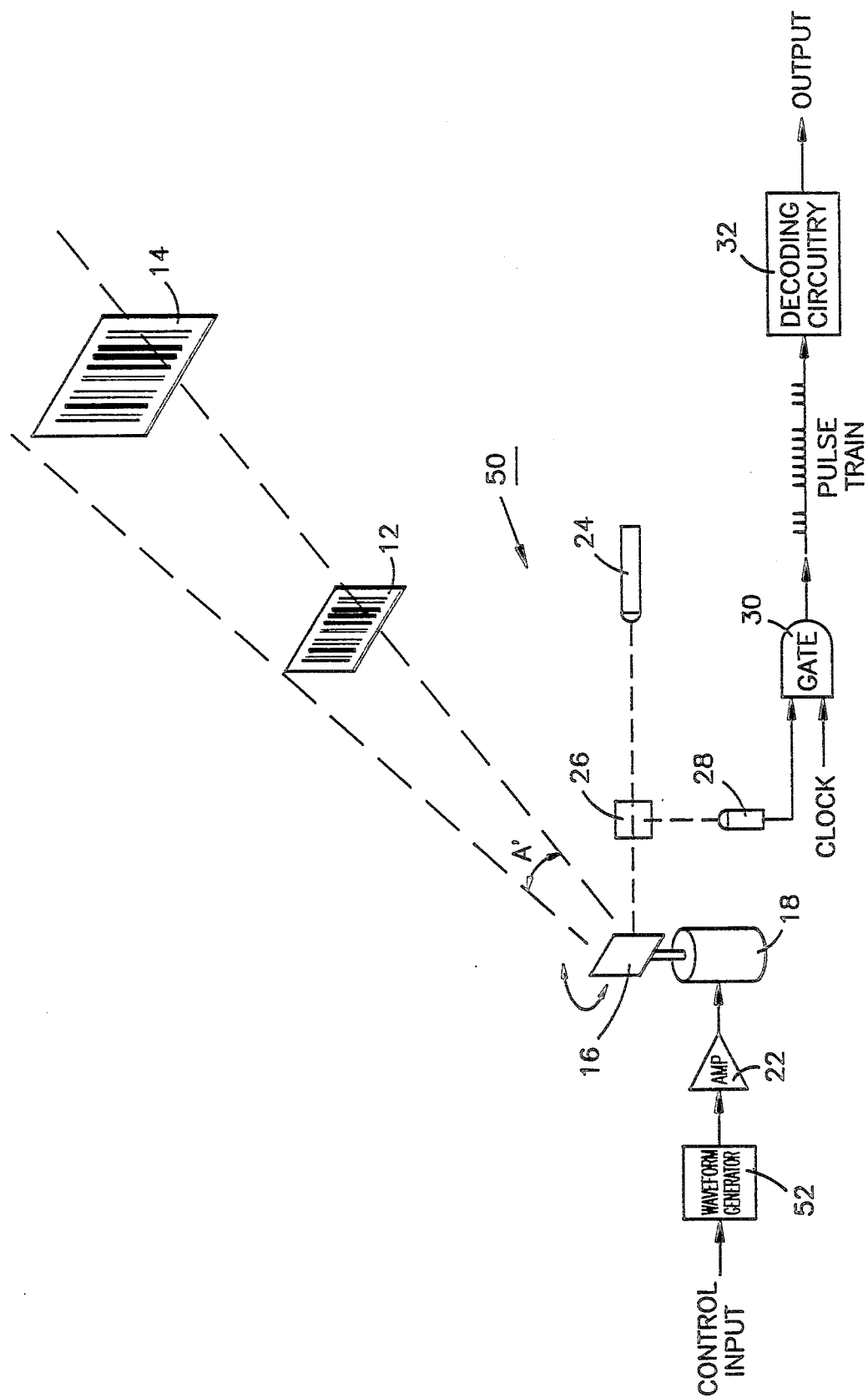
FIG. 3 is a partially perspective and partially schematic view of a bar code reading system according to one aspect of the present invention.

In order to overcome the limitations of bar code reader 10 and other prior art bar code readers, the present invention provides in one embodiment, illustrated on FIG. 3, a bar code reader, generally indicated by the reference numeral 50, which produces a light beam from mirror 16 having a sweep angle A' which is variable in amplitude and frequency. (It will be understood that, as used herein and in the appended claims, "sweep angle" refers to the travel of the scanning beam and "sweep angle amplitude" refers to the length of travel of the scanning beam). The result is indicated on FIG. 4 where is can be seen that angle A' initially has a relatively small amplitude, with the amplitude increasing with time. When a maximum selected amplitude is reached, the amplitude of angle A' returns (not shown) to its lowest value and again increases following the pattern shown on FIG. 4. The process is reiterated, so that the reader produces a scan angle A' the amplitude of which increases in a series of "bursts" until a bar code is read. If the bar code is narrow, it will be read early in a burst, regardless of whether it is close to or far from the bar code reader; provided, of course, that it is within the focal depth of the reader. If the bar code is wide, it will be read late in a burst—again, regardless of whether it is close to or far from the bar code reader. To compensate for the fact that a constant frequency scanning beam oscillation could produce a scan rate which could be too high to read a narrow bar code at a distance, FIG. 4 also indicates that the frequency of the scan is decreased as the amplitude of the scan angle A' is increased. Thus, through the relationships set forth above, the scan rate is decreased to maintain the number of counts per bar code element relatively constant. Good resolution is assured for either type of bar code: there are sufficient counts when reading high-density bar codes and overloading of decoding circuitry 32 is avoided when reading low-density bar codes, regardless of the distance of either from the bar code reader. Additionally, the operator does not have to change his position relative to the bar codes to compensate for the type of bar code being read. The bar code reader is, in effect, self-adjusting to compensate for distance.

The present invention also improves the ability of an operator to read a bar code that has closely adjacent bar codes. The operator may simply aim the bar code reader fairly accurately at the bar code and initiate scanning. The scanning angle A', starting with a small amplitude and then "bursting" as described above, will expand only to the degree that an information code plus the quiet zones at each end thereof are scanned and then the bar code reader will indicate that a code has been read. This greatly reduces the possibility that the scanning beam will overlap any adjacent bar codes, which could potentially cause an erroneous reading. To further help improve accuracy, a conventional spotting light may also be employed.

Figure 4:
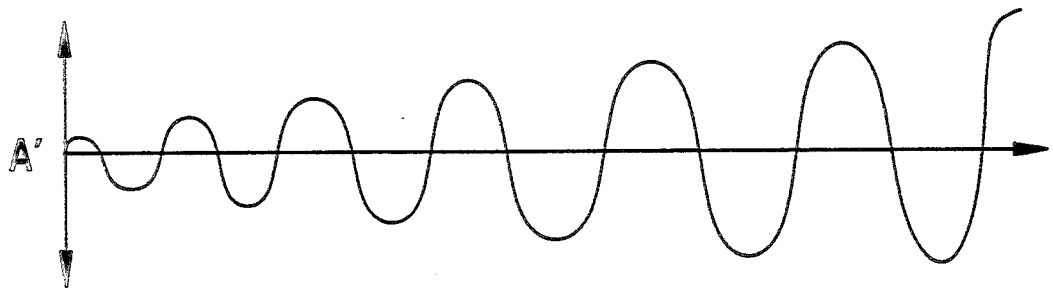
FIG. 4 indicates the scan angle amplitude and scan frequency of the system of FIG. 3.

The means ny which the variable-sweep angle A' of FIG. 4 is produced may be seen by reference again to FIG. 3. Here, the constant oscillation angle control circuitry 20 of bar code reader 10 (FIG. 1) has been replaced with a waveform generator 52 which produces an output signal to amplifier 22 to drive oscillator 18 in such a manner as to produce the waveform shown on FIG. 4. All other elements of bar code reader 50 have the same functions as described for the like numbered elements of bar code reader 10 (FIG. 1).

Figure 6:
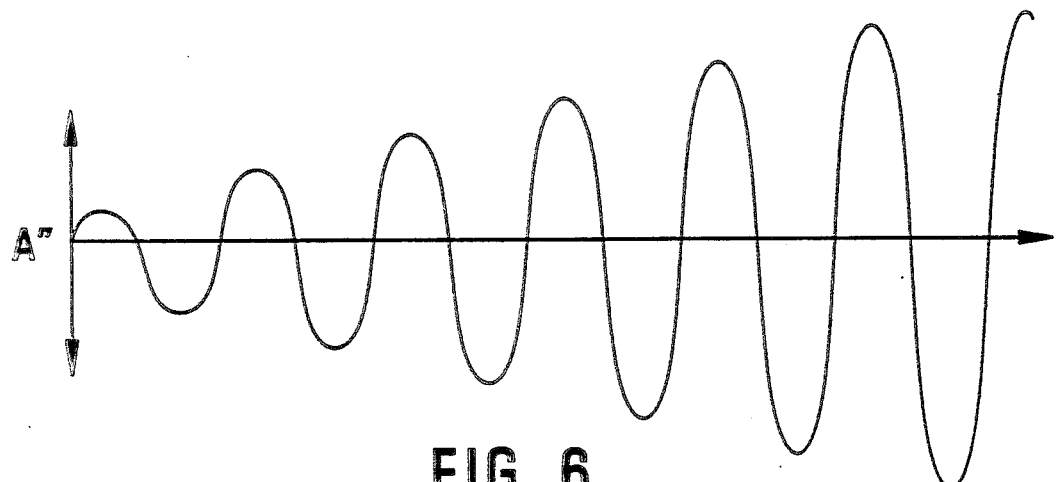
FIG. 6 indicates the scan angle amplitude and scan frequency of the system of FIG. 5.
Figure 5:
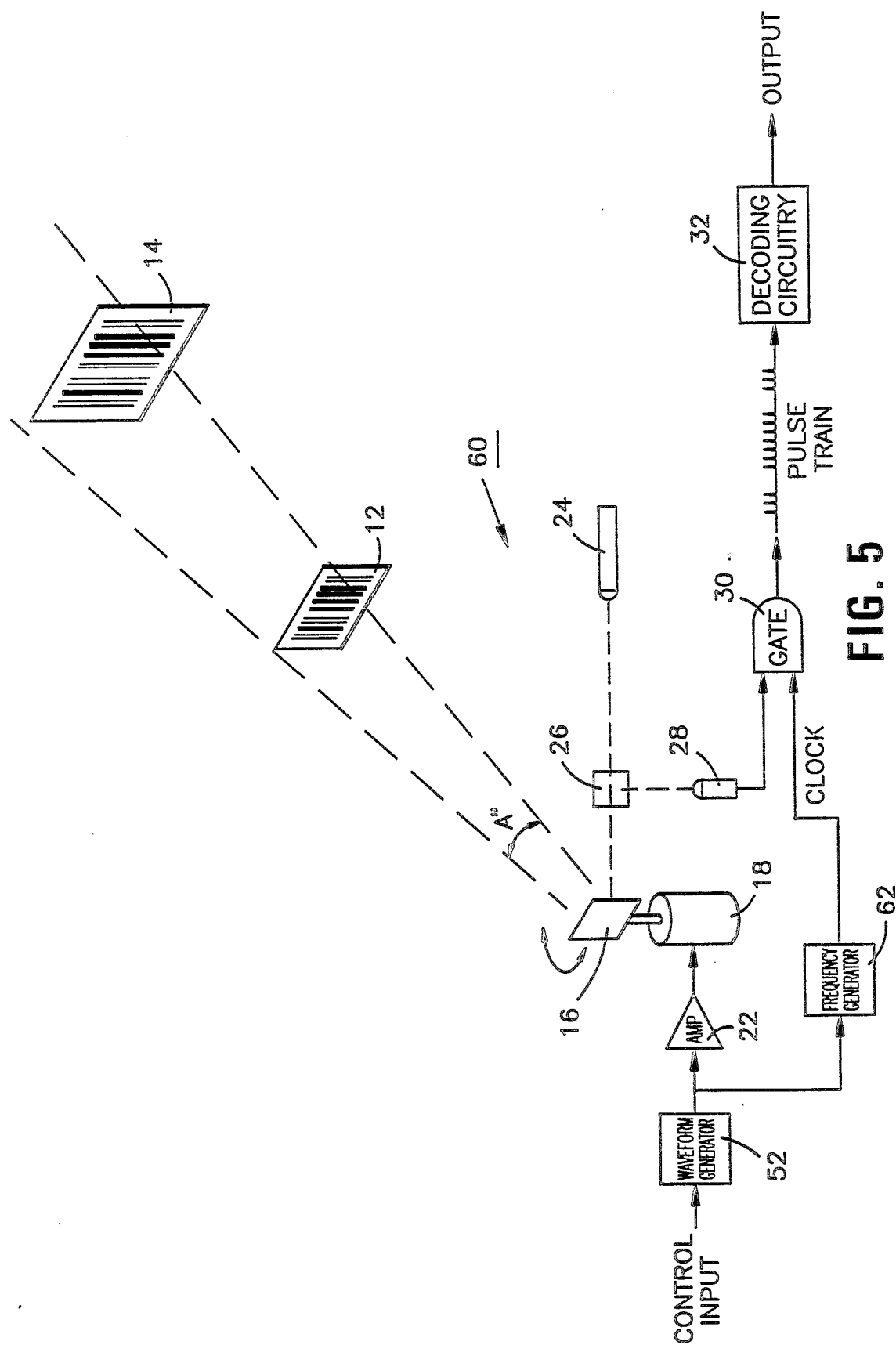
FIG. 5 is a partially perspective and partially schematic view of a bar code reading system according to another aspect of the present invention.

Another embodiment of the present invention is shown on FIG. 5, which embodiment produces an oscilating scanning team having a variable sweep angle A" as indicated on FIG. 6. Here, it can he seen from FIG. 6 that the amplitude of angle A" increases in a manner similar to that of angle A' on FIG. 4, but that the frequency of oscillation is constant, as is the case with angle A on FIG. 2. The constant frequency of oscillation of the light beam would normally have the effect of increasing the scan rate across bar codes far from bar code reader 60, as compared to that across a bar code close to the bar code reader: however, the present invention compensates for this difference, as can be seen by reference again to FIG. 5. Here, the uniform clock signal input to AND gate 30 has been replaced with an output from a frequency generator 62, the input of which frequency generator is the output of waveform generator 52. Thus, When waveform generator 52 produces an output calling for increasing amplitude of sweep angle A", frequency generator 62 provides an increasing clock rate input to AND gate 30, thus maintaining a selected rate of counts per bar code element.

Figure 7:
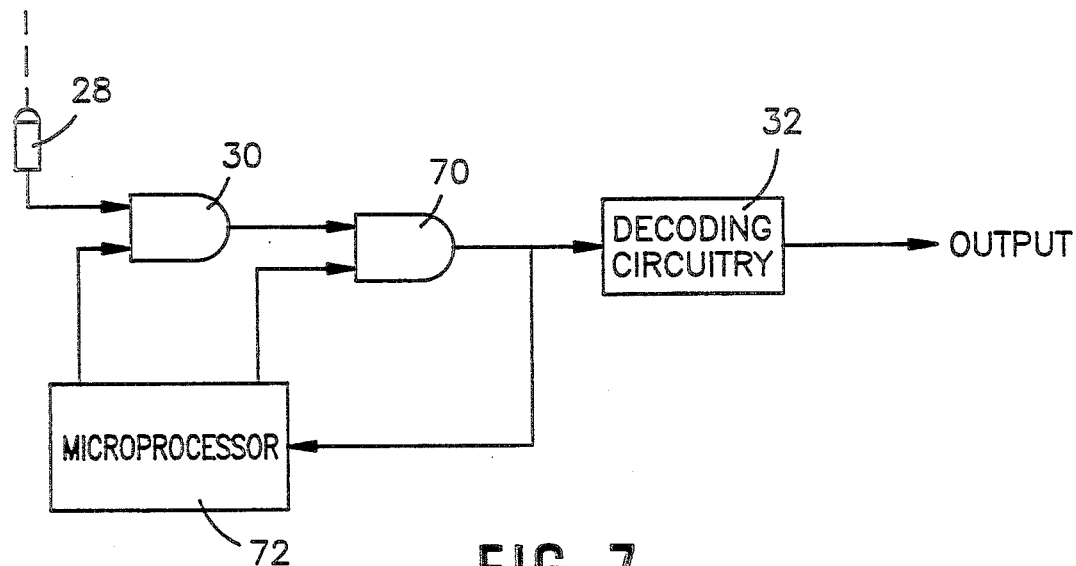
FIG. 7 is a schematic diagram illustrating a bar code reading system according to a further aspect of the present invention.

In the embodiments described above and shown on FIGS. 3 and 5, the "bursting" effect is achieved by physically varying sweep angle A, which has constant frequency and amplitude, to produce sweep angles A' and A", which have varying frequency and/or amplitude. FIG. 7 shows an embodiment of the present invention in which the frequency and amplitude of scan angle A remain constant, while the bursting effect is achieved electronically. Here, the output signal of detector 28 is gated through AND gate 30 to provide a pulse train as shown on FIG. 1 and that pulse train is now (FIG. 7) an input to a second AND gate 70 the other input to which is a signal from a microprocessor 72.

Figure 8:
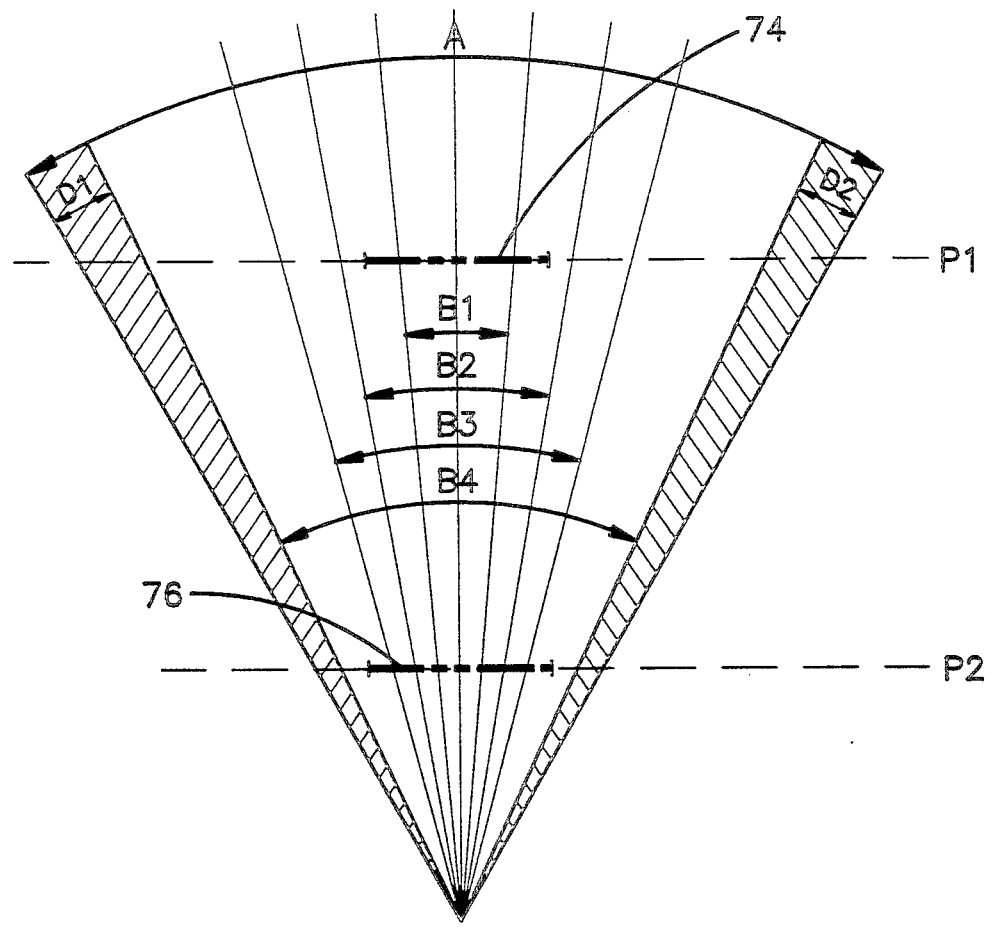
FIG. 8 indicates the varying portion of scan angle read with the system of FIG. 7.

Reference also now to FIG. 8 will illustrate the effect of the second input to AND gate 70 from microprocessor 72. FIG. 8 shows the sweep of angle A, the frequency and amplitude of which, as noted above, remain constant. Although the amplitude of the sweep of angle A is constant, the second input to AND gate 70 varyingly limits the length of the pulse train from AND gate 30 that passes through the AND gate.

It may be assumed, for purposes of illustration, that the "window" defined by angle B1 is "open" during the first sweep of angle A. During the second sweep of angle A, the second input to AND gate 70 opens the window to the scope of angle B2; during the third sweep, the window is opened to angle B3; and during the fourth sweep, the window is opened to angle B4. Again, it will be understood that angle A is sweeping through its full amplitude, although only the extent of the sweep through the open window is passed to decoding circuitry 32. Thus, by providing an input to AND gate 70 from microprocessor 72 of appropriately lengthening period, the desired bursting effect is achieved without having to change the operation of the hardware components of the bar code reading system. It will be understood that the four increments of window opening are shown for illustrative purposes only and that, in actuality, a such larger number of increments would be provided normally. Also, it is preferable that the bursting open of the window be symmetrical with respect to angle A, as shown on FIG. 8, but such is not necessary for practicing the present invention.

Referring still to FIG. 8, if a bar code 74 is positioned at plane P1 (the bar code being shown in edge view), the bar code will be read during the second sweep of angle A, that is, it will be read in the window opening corresponding to angle B2 because that is the first window opening in the burst that fully encompasses the bar code. Likewise, if a similar bar code 76 is positioned at plane P2, the bar code will not be read until the window opening corresponds to angle B4 because that is the first window opening in the burst that fully encompasses the bar code.

It can be seen from the above discussion relative to clock rates, that if the clock rate remains constant as the window is burst open, there may exist the problems of generating too many pulses when a bar code is at plane P2 and too few pulses when a bar code is at plane P1. Too compensate for this, microprocessor 72 may be programmed to decrease the clock rate as the window opening increases. Preferably, however, microprocessor 72 samples the pulse train from AND gate 70 and analyzes that signal to determine the degree of resolution of the data and adjusts the clock to provide improved resolution during the next sweep. The next signal is then sampled to determine the degree of enhanced resolution resulting from the first adjustment, and the clock is again adjusted for the next succeeding sweep, and so forth, until a signal of satisfactory resolution is attained. The interval of time required for such signal analysis and adjustment of the clock may occur during the portions of angle A in which the window is closed and/or during dwell portions D1 and D2 of angle A (shown shaded on FIG. 8), the latter being typically present in such readers, due to the fact that the sweep of the beam desirably extends past the sides of the aperture in the reader through which the beam is projected.

While, in most cases, it is desirable to maintain the count rate constant regardless of variations in sweep angle amplitude, beam oscillation frequency, and/or window opening, it may, in other cases, be desirable that the relationships of the parameters not be linear and such is also within the intent of the present invention. It is also within the intent of the present invention that other combinations of the components described with respect to specific embodiments may be employed. For example, without limitation, microprocessor 72 in the embodiment shown on FIG. 7 could be used to vary the frequency and/or amplitude of oscillation of mirror 16 in the embodiments shown on FIGS. and 3 and 5.

A further aspect of the invention is to provide means, such as a second mirror (not shown), to vary the scanning beam up-and-down as well as to-and-fro to obtain a broader range of scanning. This variation is especially useful when a fixed bar code scanner is being used to read bar codes on passing objects, as it increases the total area in which a bar code may be read. The up-and-down varying of the scanning beam may be either linear or of the bursting amplitude window types, as described above.

It will be understood that the shapes of angles A', A", and A of FIGS. 4, 6, and 8, respectively, need not be sinusoidal, but may be of any desired shape, such as square, trapezoidal, or saw-toothed, for example. It will also be understood that, although the present invention has been described as being applied to a particular type of scanning bar code reader, it may be applied as well to other types of scanning bar code readers It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A reader, comprising:
   a) a light source to produce a beam of light;
   b) scanning means to cause said beam of light to travel through an angle of selected amplitude and to sweep across, in a continuous series of sweeps, at a selected scan rate, coded indicia consisting of a pattern of relatively more and less reflective regions;
   c) photodetector means to detect light reflected from the relatively more reflective regions of said coded indicia and thereby discriminate between said more and less reflective regions; and
   d) means, connected to said scanning means, to selectively vary said selected amplitude for successive sweeps of said beam of light and to cause said scan rate to remain relatively constant as said selected amplitude is increased, by decreasing the frequency of said scan as said amplitude is increased.

2. A reader, comprising:
   a) a light source to produce a beam of light;
   b) scanning means to cause said beam of light to travel through an angle of selected amplitude and to sweep across, in a continuous series of sweeps, at a selected scan rate, coded indicia consisting of a pattern of relatively more and less reflective regions;
   c) oscillator means connected to drive said scanning means;
   d) photodetector means to detect light reflected from the relatively more reflective regions of said coded indicia and thereby discriminate between said more and less reflective regions;
   e) means, connected to said scanning means, to selectively vary said selected amplitude for successive sweeps of said beam of light, said means including waveform generating means having an output signal to which said oscillator means is responsive and in response to which signal said oscillator causes said amplitude to vary in a selected manner;
   f) gate means to receive as one input the output of said photodetector and as the other input a clock signal, such that said gate means will output a pulse train comprising groups of pulses corresponding to the widths of said nonreflective regions; and
   g) frequency generator means the input of which is the output of said waveform generator and the output of which is said clock signal, such that the frequency of said clock signal increases directly in proportion to the increase in said amplitude to compensate for the resulting increase in said scan rate in proportion to said increase in said amplitude.

3. A reader comprising:
   a) a light source to produce a beam of light;
   b) scanning means to cause said beam of light to travel through an angle of selected constant magnitude and to sweep across, at a selected scan rate, coded indicia consisting of a pattern of relatively more and less reflective regions;
   c) photodetector means to detect light reflected from the relatively more reflective regions of said coded indicia and thereby discriminate between said more and less reflective regions;
   d) pulse-generating means connected to receive an output signal from said photodetector means and to produce a pulse train representative of said pattern during a selected portion of said angle of constant magnitude of the swept beam of light; and
   e) means, connected to said pulse generating means, to vary the selected portion of said angle of constant magnitude of the swept beam of light during which said pulse-generating means produces said pulse train.

4. A reader, as defined in claim 3, wherein:
   (a) said pulse-generating means comprises gate means to receive as one input the output of said photodetector and as the other input a clock signal, such that said gate means will output a pulse train comprising groups of pulses corresponding to the widths of said nonreflective regions; and
   (b) said means to vary said selected portion of said angle of constant magnitude of the swept beam of light provides said clock signal and decreases the rate of said clock signal as said selected portion increases.

5. A reader, as defined in claim 3, wherein said means to vary said selected portion of said amplitude additionally samples said pulse train and varies, as necessary, the rate of said clock signal to enhance the resolution of said pulse train for succeeding sweeps of said angle.

* * * * *